May 19, 1942.  W. H. FRICK  2,283,853
BROILER
Filed March 18, 1940  4 Sheets-Sheet 1

INVENTOR
W. H. Frick
Patterson, Wright &
Patterson
ATTORNEYS

May 19, 1942.  W. H. FRICK  2,283,853
BROILER
Filed March 18, 1940  4 Sheets-Sheet 3

INVENTOR
W. H. Frick
By
Bateman, Wright & Pattison
ATTORNEYS

May 19, 1942.　　　W. H. FRICK　　　2,283,853
BROILER
Filed March 18, 1940　　　4 Sheets-Sheet 4
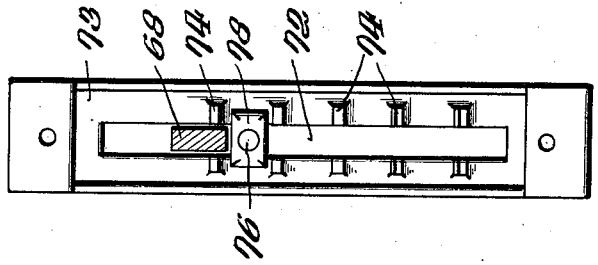
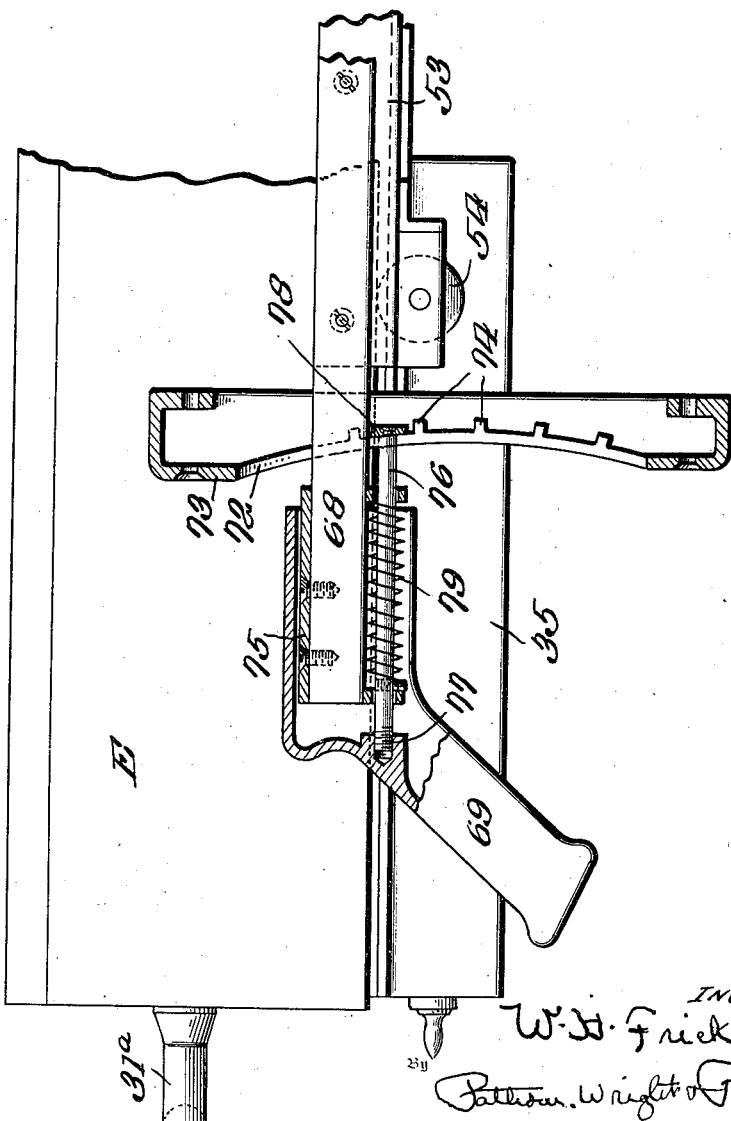
INVENTOR
W. H. Frick
Patterson, Wright & Patterson
ATTORNEYS Patented May 19, 1942

2,283,853

UNITED STATES PATENT OFFICE 2,283,853

BROILER

William H. Frick, Cleveland, Ohio, assignor to American Stove Company, St. Louis, Mo., a corporation of New Jersey Application March 18, 1940, Serial No. 324,707

13 Claims. (Cl. 126—41)

This invention relates to broilers but pertains more particularly and specifically to an improved top and bottom fired broiler and has as one of its major objects the provision of a device of this kind in which the food or utensil supporting element, ordinarily referred to as a broiler grid or pan, can be moved outwardly from the broiling chamber or oven while the lower broiler burner is in operation without in any way endangering the proper operation of the upper broiler burner.

Another object of the invention is to provide a top and bottom fired broiler in which the lower broiler burner and the broiling grid or pan are associated to form a unit which can be raised and lowered at will within the broiling chamber and can be pulled outwardly, at will, from the broiling chamber irrespective of the particular vertical position at which they may have been set within said chamber.

Another object of the invention is to provide in a top and bottom fired broiler a unitary lower broiler burner and broiling grid or pan constructed in a novel manner to permit their movement either vertically or horizontally as a unit.

Another object of the invention is to provide a cooking appliance having both baking and broiling ovens of unique and novel construction and in which a novel flueing arrangement is provided for the broiling oven which is such as to assist in heating the baking oven which is disposed in superposed relationship to the broiling oven.

Other specific objects and novel features of construction are obtained as a result of the improved construction and the nature of which will appear from the following detailed description when read in the light of the accompanying drawings which illustrate a preferred and a modified construction which embody the inventive concept.

In the drawings:

Fig. 3 is a top plan view of a modified form of unitary lower broiler burner and broiling grid or pan.

Fig. 4 is a vertical sectional view of the construction appearing in Fig. 3 of the drawings.

Fig. 5 is an enlarged fragmentary vertical sectional view through the broiling grid and pan.

Fig. 6 is a side view, partly in vertical section, illustrating the construction utilized to lock the unitary bottom broiler burner and broiler grid in any one of a plurality of set vertical positions within the broiling oven.

Fig. 7 is a rear view of the construction appearing in Fig. 6.

It is to be understood that the present invention may be incorporated into cooking ranges or appliances of varied constructions and appearances and that the accompanying drawings are merely illustrative of one form of range and are not to be taken as limiting the invention beyond the scope of the hereinafter appended claims.

Figure 1:
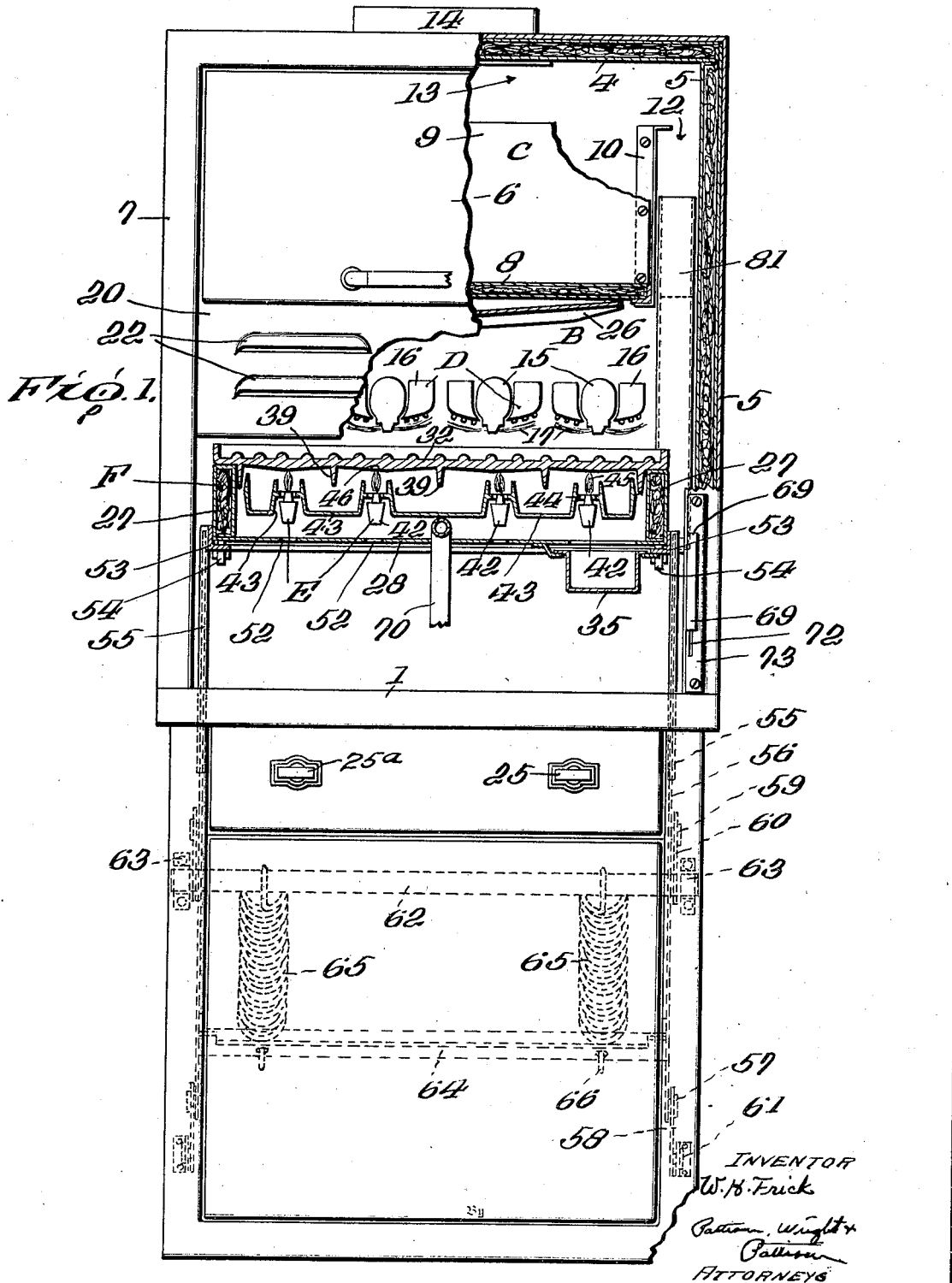
Fig. 1 is a front view of a cooking range or appliance embodying the present invention, a portion of the view being broken away and shown in vertical section.
Figure 2:
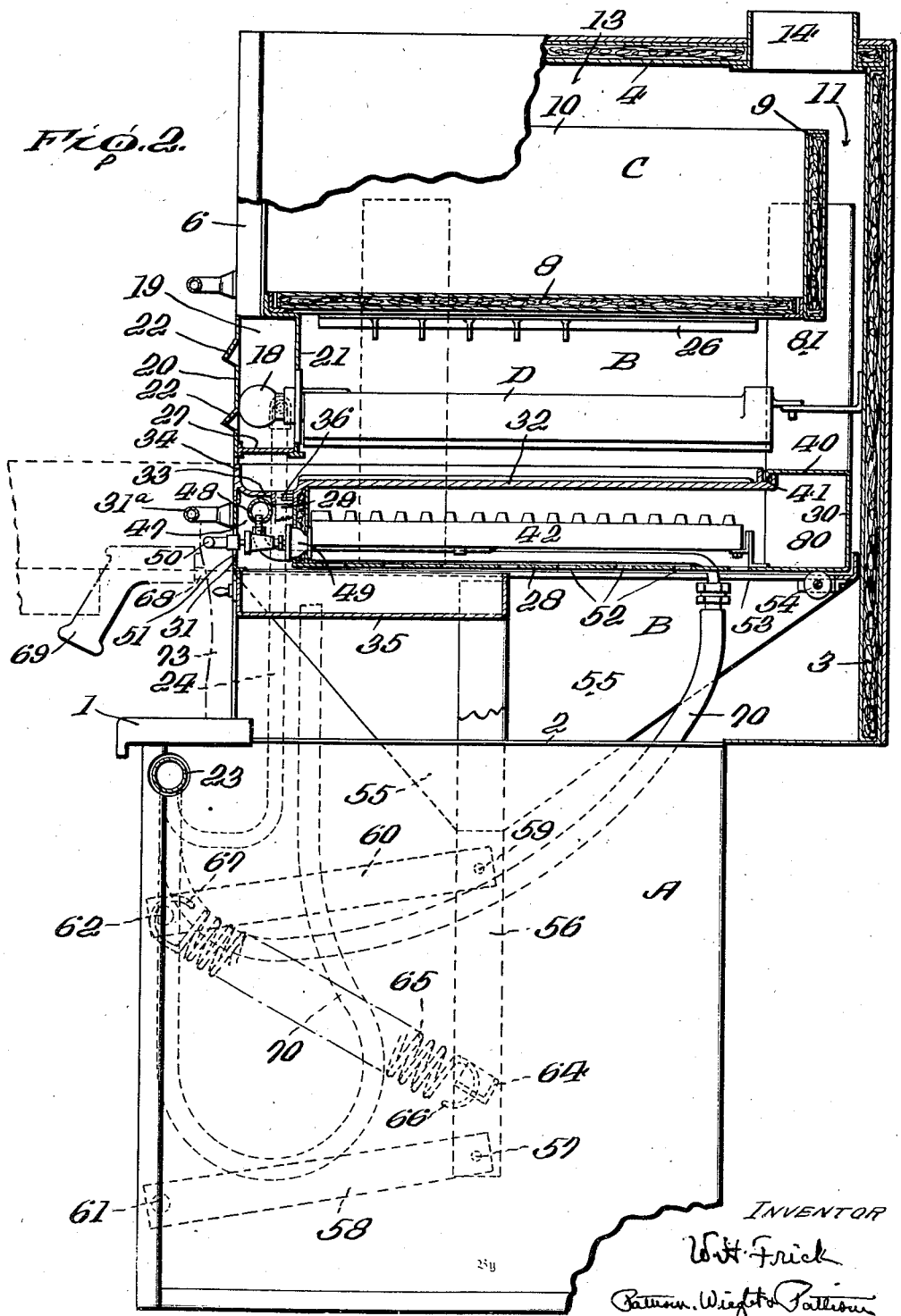
Fig. 2 is a side view of the range appearing in Fig. 1, a portion of the view being broken away and shown in vertical section to better illustrate the construction.

Having reference to Figs. 1 and 2 of the drawings it will be seen that the range comprises a substantially narrow and vertically elongated housing having in its base a chamber A which supports a large upper chamber within the lower end of which is a broiling oven B above which is positioned a baking oven C.

The upper chamber containing the broiling and baking ovens is offset rearwardly in respect to the lower chamber A to provide at the lower front of the broiling oven a shelf or table-top-like working surface or area 1. This lower chamber is completely enclosed with the exception of its top which is completely open, as at 2, for communication with the lower end of the broiling oven B.

It has been found preferable to insulate ranges of this nature and accordingly the rear wall 3 of the upper chamber is of a double wall insulated type as is likewise the top 4 and side walls 5 of the chamber.

The baking oven is defined by a front door 6 and a surrounding front frame 7, a fully insulated bottom 8, a rear wall 9 and side walls 10. It is to be noted that the rear wall 9 of the oven is in spaced parallel relationship to the rear wall 3 of the chamber to provide a vertically extending flue passageway 11 and that the side walls 10 of this oven are in spaced parallel relationship to the side walls 5 of the chamber to provide vertically extending flue passageways 12 at each side of the cooking oven. It is to be further noted that the side and rear walls of the baking oven stop short of the top 4 of the range so that there is a space 13 which extends completely over the baking oven and has communication with the upper ends of the aforementioned flue passageways 11 and 12. An outlet opening or vent 14 is provided through the top 4 of the chamber and is preferably, although not necessarily, so positioned as to be above the flue passageway 11 at the rear of the baking oven. This vent 14 is the usual flue outlet opening provided in all cooking ranges and if desired a pipe or conduit may be coupled to it so as to conduct the flue gases and hot products of combustion to discharge exterior of the room in which the range is operated.

The upper broiler burner is designated as an entirety at D and is illustrated as comprising a plurality of elongated burner arms 15 arranged in separated parallel relationship and extending from the front to the rear of the upper end of the broiler chamber beneath the bottom 8 of the baking oven. A plurality of radiants 16 are associated with these burner arms and are disposed in the spaces between the arms as well as at the outer sides of each of those burner arms nearest the side walls of the broiling oven. The burner arms have their burner orifices in their lower or under faces so as to burn flames across the lower ends or faces of the radiants as indicated at 17 in Figure 1 of the drawings.

The front ends of the upper broiler burner arms are connected to receive fuel from a manifold pipe 18 positioned within a manifold chamber 19 which lies between the range front panel 20 and a supplemental inner panel 21. The panel 20 is arranged to lie in substantially flush relationship to the front of the door 6 and is provided with louvres 22 which ventilate the chamber 19 to prevent it from becoming overheated. The pipe 18 receives its gas from the main gas supply manifold 23 positioned in the lower housing A through suitable pipe connections 24. At the front of the lower housing a pair of valves 25 and 25a are provided for controlling the flow of fuel to the upper broiler burner which is made in the form of two independently controllable burners. It will be obvious that should it be desirable a construction could be provided which would provide independent control of fuel supply to each of the several burner arms making up the upper broiler burner.

The baking oven receives its heat primarily from the upper broiler burner and to prevent localized overheating of the bottom of the baking chamber a combined heat deflector and insulating plate 26 is provided at the under side of the baking oven bottom 8.

It will be understood that the louvres 22 provide for the admission of primary air into the fuel manifold chamber 19 so that it may be mixed with and injected into the upper broiler burner arms in accord with the usual practice. I contemplate using gas as a fuel but it is to be understood that other suitable like fuels could be equally well utilized. The manifold chamber 19 is provided with a bottom 27 so that primary air can be admitted to the manifold chamber only through the louvres.

By reference particularly to Fig. 1 of the drawings it will be seen that the front end of the broiling oven is open from the lower end or edge of the panel 21 down to the table-top or shelf 1. The lower broiler burner which is designated as an entirety by E is however completely enclosed in what might well be described as a vertically and horizontally movable drawer which for simplicity of description is designated as an entirety by F.

This drawer has insulated side walls 27 which are disposed in separated parallel relationship to the side walls 5 of the upper housing, it has a bottom 28, a front insulated wall 29 and a rear wall 30 which last named wall is in spaced parallel relationship to the rear wall 3 of the broiler oven or main housing. The front wall 29 of the drawer is in spaced relationship to the front of the range and the real front outer wall or face of the drawer is in the form of a panel 31 to which is attached a drawer operating handle 31a. The top of the drawer is closed by a broiling pan 32 which is inclined downwardly from its rear towards its front end so that meat juices, greases or the like will drain into the sump 33 provided at and extending across the front end of the pan. The front edge of the sump is flared upwardly as at 34 and is disposed in flush relationship to form with the panel 31 the entire front end of the drawer and by reference to Fig. 2 of the drawings it will be seen that when the drawer is completely within the broiling oven the front end thereof is disposed in flush relationship with the aforementioned panel 20 which is at the upper front end of the broiling oven.

A drawer-like grease reception reservoir 35 is suspended at the under side of the drawer bottom 28 and its support is such that it can be slid or pulled horizontally outward from its support and the broiling oven be emptied as occasion requires. A suitable pipe or conduit 36 interconnects the broiling pan sump with the reservoir 35.

It will be obvious that the broiling pan serves as a supporting member for a utensil or food and it will be clearly as obvious that if it is found desirable a grid, such as that illustrated at 37 in Fig. 5 of the drawings can be provided for use within the broiler pan. When a grid is used it is preferably provided at its under side with a plurality of supporting legs or lugs 38 so as to elevate it above the bottom of the pan to permit meat juices and grease to run freely down the pan into the sump 33 thereof.

The broiling pan at its under side is preferably provided with heat absorption and strengthening fins 39.

By reference to Fig. 2 of the drawings it will be seen that the rear end of the broiling pan stops considerably short of the rear end 30 of the drawer and that the resulting space at the top of the drawer is closed by a short top wall 40 which has its forward edge downturned to seat within a suitable channel-way 41 provided at the rear edge of the broiling pan.

The lower broiler burner is composed of a plurality of individual burner arms 42 which are arranged in spaced parallel relationship within the drawer approximately intermediate its height and extending from front to rear of the drawer and of the broiling oven. Intermediate each of the burner arms 42 and intermediate the drawer side walls 27 and the adjacent burner arms I have provided trough-like channelways 43 which are preferably of a U-shape in cross sectional configuration and of a length similar to that of the burner arms and having a depth so that their side walls extend both above and below the burner orifices which are in the upper faces of the burner arms. These troughs being U-shaped have their open sides at their tops and the upper edges of their side walls terminate short of the under side of the broiler pan 32. The fins 39 at the under side of the broiler pan extend downwardly into these channelways. The channelways are connected by webs provided with openings 44 through which extend the burner ports of the burner arms so that the flames 45 are above the webs and directed toward and against the under side of the broiler pan. The broiler pan immediately above each burner arm and the burner orifices thereof is thickened as at 46 so that the intense heat of the flames is directed against the thickest portion of the broiler pan and due to the inclination at each side of the thickened portion of the pan the heat and hot products of combustion are directed over the upper ends and into the adjacent troughs or channelways 43. These hot products of combustion tend to travel rearwardly in these channelways under the thinner portion of the broiler pan due to the fact that the rear end of the drawer, as will hereinafter be described, is provided with a pair of flue outlet conduits which tend to create a draft from the front towards the rear of the drawer. This draft is accelerated due to the fact that secondary air is admitted at the front end of the drawer as will hereinafter be explained.

By reason of the outer front panel 31 of the drawer being in separated relationship to the inner front wall 29 a housing 47 is provided for the reception of a fuel manifold pipe 48 from which fuel is delivered to the several mixing bells 49 of the burner arms 42. Valves 50 are provided at the outer side of the drawer front panel 31 for controlling the flow of fuel to each of the several burner arms. It will be understood however that a plurality of valves could be provided if desired so as to afford individual fuel control to each of the burner arms. The bottom of housing 47 is left open to provide for the admission of primary air for mixture with the fuel admitted to the mixing bells of the burner arms.

Secondary air for the support of the flames burned at the arms constituting the lower broiler burner is admitted into the drawer through a plurality of openings 52 provided in the drawer bottom 28 and this secondary air is fed to the burner flames through the openings 44 through which the burner carrying orifice portions of the burner arms extend. Thus it will be seen that secondary air must pass closely by and around the burner ports in its passage into the upper portion of the combustion chamber which is in the upper end of the drawer E.

The drawer E is supported upon a pair of L-shaped angle irons 53 which parallel the side walls of the broiler chamber and extend from front to rear thereof and are provided in their horizontal legs with rollers 54 which engage the bottom of the drawer. Thus the drawer may be readily pulled outwardly and pushed inwardly through the open front end of the broiler oven.

The angle irons constituting the trackway for the drawer are in turn supported upon the upper ends of a pair of vertically disposed plates 55 which are of a substantially triangular shape. A vertically disposed arm or standard 56 is attached to each of these plates and extends downwardly into the lower compartment A where they have pivotal attachment at their lower ends as at 57 with the transversely extending cross arms 58 and at a point intermediate their lengths pivotal connection as at 59 with transversely extending cross arms 60. The cross arms 58 at their outer or front ends are pivotally attached as at 61 to the range frame while the outer or front ends of the cross arms 60 are pivotally connected to a transversely extending shaft 62 the ends of which are secured within suitable bearing blocks 63.

The lower ends of the vertical standards 56 are interconnected by a cross brace or tie bar 64. A pair of coil springs 65 have their lower ends connected to this cross brace as at 66 from which point they incline upwardly and forwardly for attachment as at 67 to the aforementioned transversely extending shaft 62.

One of the drawer trackways is provided with an extension arm 68 which extends outwardly through the open front of the broiler and has operatively connected thereto a handle 69.

By grasping the handle 69 it will be obvious that the trackways can be elevated and lowered within the broiling oven and that the drawer E carrying the lower broiler burner and the grid will be elevated or lowered as a unit with these trackways. To permit of this movement the main gas supply manifold pipe 48 for the lower broiler burner is connected to the main supply conduit 23 by a flexible conduit 70.

The specific construction just described constituting the plates 55, vertical arms 56, cross arms 58 and 60 and the pivotal support thereof constitute both a supporting and guiding means for the movement of the drawer. The coil springs constitute a counter-balancing mechanism in that they tend normally to hold the drawer in an elevated position thus reducing the effort necessary to raise the drawer and reducing the tendency exerted by gravity upon the drawer to cause it to move downwardly too rapidly.

It will be obvious that the raising and lowering of the drawer is desirous and highly advantageous in the performance of cooking operations in the broiling oven.

Means is provided for locking the drawer in any of its set positions of adjustment and for pulling the drawer outwardly through the open front end of the broiling oven when it is desired to inspect the cooking operation being performed on the broiler grid or pan. This means is specifically illustrated in Figures 6 and 7 of the drawings and will now be described.

The aforementioned trackway extension arm 68 passes through an elongated opening 72 in a lock housing 73 which is suitably secured to the front frame of the range at one side of the open front of the broiling oven. The front wall of the housing in which is the aforementioned opening 72 is provided with a plurality of spaced inwardly extending and horizontally disposed lugs or shoulders 74.

A sleeve 75 telescopically receives and is secured to the arm 68 and has portions extending downwardly beyond the bottom edge of the arm. A plunger pin 76 is reciprocable with said sleeve extending portions and has its outer end threadedly supported as at 77 in a suitable socket on the inner face of the handle 69. The pin extends inwardly through the elongated opening 72 and at its inner end is provided with an enlarged head 78 which is of a dimension too great to permit its passage outwardly through the opening 72. This head is adapted to be selectively positioned in the spaces between the spaced transversely extending lugs or shoulders 74 and is held in clamped relationship against the inner face of the housing at either side of said opening under the tension of a coil spring 79 which is mounted upon the plunger pin 76.

It will be seen that this spring tends normally to hold the head 78 in locked position between a pair of adjacent shoulders 74 and thus prevent any vertical movement of the drawer E and will support said drawer and its associated mechanism in any one of a plurality of positions in a vertical plane at which it may be set. When however an inward pressure is exerted upon the handle 69 this handle together with the pin and its enlarged head 78 are moved inwardly with the result that the head is moved into a position where it will clear the lugs or shoulders 74 and thus permit the drawer and its associated parts to be raised or lowered by the application of lifting or lowering force upon the handle 69.

Thus it will be seen that the drawer together with the lower broiler burner and broiling pan or grid can be elevated or lowered within the broiling oven and can be locked in any one of a plurality of set positions to provide easy and rapid adjustment of the broiler grid in respect to the top broiler burner. It will be further seen and understood that by grasping the drawer handle 31a the drawer can be pulled outwardly from the broiling oven and that this can be done irrespective of the particular vertical position in which the drawer is set.

By reference to Figure 2 of the drawings it will be seen that there is a chamber 80 in the rear end of the drawer and that this chamber extends entirely across the rear end of the drawer. At each end of the drawer and extending vertically upwardly therefrom I have provided a flue conduit 81 the lower end of each of which is in communication with said drawer chamber 80. These conduits extend upwardly into the flue passageways 12 at each side of the baking or cooking oven C and are movable vertically in said flueways 12 as the drawer is raised or lowered and are additionally movable in a horizontal plane, that is forwardly and rearwardly, as the drawer is pulled outwardly and moved inwardly into the broiling oven. The upper ends of said conduits 81 communicate with the oven outlet 14 through said passageways 12 and the space 13 above the cooking oven and the hot products of combustion discharged by them will tend to heat said oven.

The flue construction is such as to provide an extremely simple means of discharging the hot products of combustion generated by the lower broiler burner in a manner whereby they are bypassed at all times to prevent their interference with the operation of the upper broiler burner by avoiding any possibility of said hot products of combustion intermingling with the secondary air which supports combustion at said upper broiler burner.

Additionally the flue construction provides a draft from the front towards the rear of the drawer so that the hot products of combustion generated by the burners in said drawer flow from front to rear in the trough-like channelways 43 under the thinner portions of the broiling pen which portions are between the burner arms.

In Figures 3 and 4 of the drawings a modified form of the invention is illustrated and the main difference of construction of this form of the invention over the previously described form resides in the lower broiler burners. Much of the construction is the same as that heretofore described and hence similar reference characters are utilized to designate the parts heretofore described.

There is the same drawer E but in this instance the bottom 83 is solid. The upper end of the drawer is closed by the broiler pan 32 provided at its front end with the same sump 33. There are the same upwardly and vertically extending flue conduits 81 at the rear opposite corners of the drawer and the drawer is provided with the same handle 31a at its front. There is likewise at the front of the drawer the fuel manifold chamber 84 having therein the fuel manifold pipe 85.

In this instance a plurality of individual burners K of the jet type are provided each of which has a fan shaped injection end 86 which injects or projects rearwardly under the broiling grid or pan a fanned-out flame 87. By reference to Figure 3 of the drawings it will be seen that the flames at each of the burners overlaps at its edges the flame at an adjacent burner with the result that a rearwardly projected sheet of flame is played across and against the under side of the broiling grid or pan when all of the burners are in operation.

Secondary air to support combustion in the drawer is admitted around the burner jets by making the openings 90 in the drawer supplemental front 29 of a larger size than the burner jets. Thus secondary air within the manifold chamber 47 can pass freely into the drawer.

Each of the burners is connected to the fuel supply pipe by an individual gas cock 88 provided at the front of the drawer with an individual valve handle 89 which construction provides individual control of each burner. By reason of this construction close control of cooking on the broiler grid can be obtained particularly in view of the fact that the top heat to the broiler grid can be closely controlled by raising or lowering the grid.

I have actually found that it is not essential for the troughs 43 to extend below the burner orifices of the burner arms or for the burner orifices to actually extend through the openings in the webs 44. As a matter of fact the burner orifices could be below these openings and in line therewith without too greatly reducing the efficiency of the burner.

I claim:

1. In a cooking appliance, a broiling chamber having a burner in the upper end thereof and an opening in its front, a closed drawer in the lower end of said broiling chamber and having a lower broiler burner therein, a trackway supporting said drawer and permitting the same to be moved inwardly and outwardly through said chamber front opening, an outlet flue for said broiling chamber, an outlet conduit communicating with said drawer, means to admit secondary air into said drawer to support combustion at the lower burner therein, and said drawer outlet conduit movable with said drawer and at all times communicating with said broiling chamber flue outlet.

2. In a cooking appliance, a broiling chamber having a burner in the upper end thereof and an opening in its front, a horizontally disposed trackway in the lower end of said broiling chamber, a closed drawer supported on said trackway and having a lower broiler burner therein, a broiling grid or pan forming a portion of the top of said drawer, means to move said drawer outwardly and inwardly through the opening at the front of said broiling chamber, means to raise and lower said drawer supporting trackway, a flue outlet for said broiling chamber, secondary air inlet means to said drawer, an outlet conduit communicating with said drawer and movable therewith, and said outlet conduit at all times and in all positions of said drawer communicating with said broiling chamber flue outlet opening.

3. In a cooking appliance, a broiling chamber having an opening in its front and a flue outlet opening communicating with its upper end, an upper broiler burner in said chamber, a horizontally disposed and vertically adjustable drawer support in the lower end of said chamber, a closed drawer on said support and movable thereon outwardly and inwardly through the opening at the front of said chamber, secondary air inlet means into said drawer for supporting combustion of said burner therein, a horizontally disposed flue box at the rear end of said drawer and provided with upwardly extending flue outlet conduits the upper outlet ends of which are at all times disposed in said chamber at a point above said upper broiler burner, means to raise and lower said drawer support, means to move said drawer outwardly and inwardly through said broiler chamber front opening, and said drawer flue box outlet conduits movable with said drawer and at all times communicating with said broiling chamber outlet opening, whereby the hot gases and products of combustion generated by said lower broiler burner are by-passed around said upper broiler burner to discharge.

4. An improved cooking appliance comprising, a broiling chamber having a burner in the upper end thereof and an opening at its front, a flue outlet opening in the upper end of said chamber, a closed drawer in the lower end of said chamber and having a lower broiler burner therein, means admitting secondary air into said drawer, a broiling pan forming a portion of the top of said drawer and provided at its front end with a grease collection trough, said broiling pan inclined towards said trough to cause grease to collect therein by gravity, a grease collection reservoir beneath said broiling pan sump and in communication therewith, a support for said drawer, means to raise and lower said support, means to move said drawer over said support outwardly and inwardly through said broiler front opening, a flue outlet conduit communicating wth said drawer and extending upwardly therefrom and having its upper outlet end disposed above said upper broiler burner and in communication with the flue outlet opening of the broiling chamber, and said flue outlet conduit movable with said drawer and at all positions thereof having its outlet end disposed above said upper broiler burner to by-pass the hot gases and products of combustion around said upper burner to discharge.

5. An improved cooking appliance comprising, a broiling chamber having a burner in the upper end thereof, a carrier in the lower end of said chamber, said carrier having a bottom with upwardly extending side walls and a front closure plate, a horizontally disposed flue at the rear end of said carrier, a cooking grid supported by the side walls of said carrier and closing the upper end thereof, a burner within said carrier beneath said grid, a warming oven above said broiling chamber and provided with an outlet flue, an elongated and vertically disposed flue carried by said carrier and having communication at its lower end with the horizontal flue of said carrier and at its upper end with said warming chamber, and means to elevate or lower said carrier in respect to the burner in the upper end of the broiling chamber.

6. An improved cooking appliance comprising, a broiling chamber having a burner in the upper end thereof, a carrier in the lower end of said chamber, said carrier having a bottom with upwardly extending side walls and a front closure plate, a horizontally disposed flue at the rear end of said carrier, a cooking grid supported by the side walls of said carrier and closing the upper end thereof, a burner within said carrier beneath said grid, a warming oven above said broiling chamber and provided with an outlet flue, an elongated and vertically disposed flue carried by said carrier and having communication at its lower end with the horizontal flue of said carrier and at its upper end with said warming chamber, said broiling chamber having an opening at its front, and means to elevate or lower said carrier in respect to the burner in the upper end of the broiling chamber and to pull said carrier outwardly from said broiling chamber through the opening at the front thereof.

7. An improved cooking appliance comprising, a housing having therein a broiling chamber with an oven thereabove, a passageway at one side of said oven having communication at its lower end with the broiling chamber and at its upper end with the oven, a flue outlet for said oven, said broiling chamber having a burner in the upper end thereof and an opening at its front, a carrier in the lower end of the broiling chamber and forming a housing for a lower burner, said carrier having a bottom with upwardly extending sides and closed front and rear ends, a broiler grid closing the upper end of said carrier, an elongated vertically extending outlet flue having its lower end communicating with the interior of said carrier and its upper outlet end reciprocable within the passageway at the side of said oven, a second burner within said carrier and below said broiling grid, means to elevate or lower said carrier in respect to the burner in the upper end of the broiling chamber, means to pull said carrier outwardly from said broiling chamber through the opening at the front thereof, and the outlet end of said vertical carrier flue being at all times disposed in the passageway at the side of the oven.

8. An improved cooking appliance comprising, a broiling chamber having an upper broiler burner therein, a carrier in the lower end of said chamber, said carrier having a bottom with upwardly extending side walls and front and rear closure plates, a cooking grid supported by the side walls of said carrier and closing the upper end thereof, said carrier constituting a closed housing, a lower broiler burner in said carrier, means to admit secondary air to said carrier to support combustion at the lower burner therein, an oven in said broiler chamber above said upper broiler burner and provided with an outlet flue, an elongated and vertically disposed flue supported by said carrier and having communication at its lower end with the interior of said carrier and at its upper end with said oven, means to elevate and lower said carrier in respect to the upper broiler burner, and said carrier outlet flue at all positions of said carrier communicating with said oven and by-passing the products of combustion of said lower burner around said upper burner.

9. An improved cooking appliance comprising, a housing having therein a broiling chamber with an oven thereabove, an upper burner in said broiler chamber beneath said oven, said housing at a point above said upper broiler burner being provided with a flue outlet opening, said oven having its side walls in separated relationship to said housing to provide at its sides outlet flue passageways extending throughout the depth of said housing from front to rear thereof, said outlet flue passageways at their lower ends communicating with said broiler chamber and at their upper ends communicating with said flue outlet opening, a carrier in the lower end of said broiling chamber forming a closed housing, a lower broiler burner in said housing, means to admit secondary air into said carrier housing, an elongated vertically extending flue outlet conduit positioned at each side and adjacent the rear end of said carrier and secured thereto, the lower ends of said conduits communicating with the interior of said carrier housing and the upper ends of said conduits being disposed within the flue passageways at the sides of said oven, and means to elevate or lower said carrier in respect to the upper broiler burner, the upper outlet ends of said carrier conduits at all positions of said carrier being disposed within the flue passageways at the sides of said oven.

10. In a cooking appliance, a housing provided with an outlet opening, a broiling chamber in said housing having separate upper and lower burners therein, a broiling grid intermediate said burners, said chamber extending above said upper burner and having communication with said outlet opening, the hot products of combustion of said upper burner passing upwardly through said chamber extension and discharging through said outlet opening, and means collecting and confining all of the hot products of combustion of the lower burner and conveying the same around and above said upper burner to discharge through said outlet opening, whereby the products of combustion of the lower burner are prevented from interfering with the proper operation of said upper burner.

11. A construction such as defined in claim 10 wherein, said broiling grid and lower burner are vertically movable within said chamber, and means is provided to move said members vertically.

12. A construction such as defined in claim 10 wherein, said broiling chamber is provided with an opening at its front, said broiling grid and lower burner being vertically movable within said chamber, said broiling grid and lower burner being also movable outwardly and inwardly through said chamber front opening, means to impart said movements to said broiling grid and lower burner, and the said means for collecting and conveying the products of combustion of the lower burner to discharge communicating at all possible positionings of said grid and lower burner with said outlet opening.

13. A construction such as defined in claim 9 wherein, said broiling chamber is provided with an opening at its front, said carrier being supported to permit the same to be moved outwardly and inwardly through said broiling chamber front opening, and the upper ends of said carrier supported outlet conduits at all possible positionings of said carrier being disposed within the flue passageways at the sides of said oven.

WILLIAM H. FRICK.